April 10, 1962  H. W. COLE, JR  3,028,761
HERMETICALLY SEALED ROTARY SHAFT COUPLING
Filed April 27, 1960
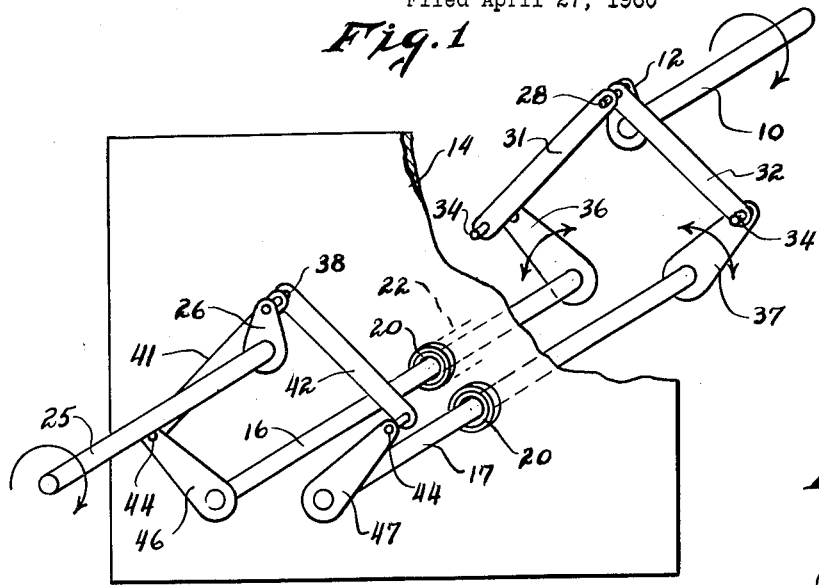
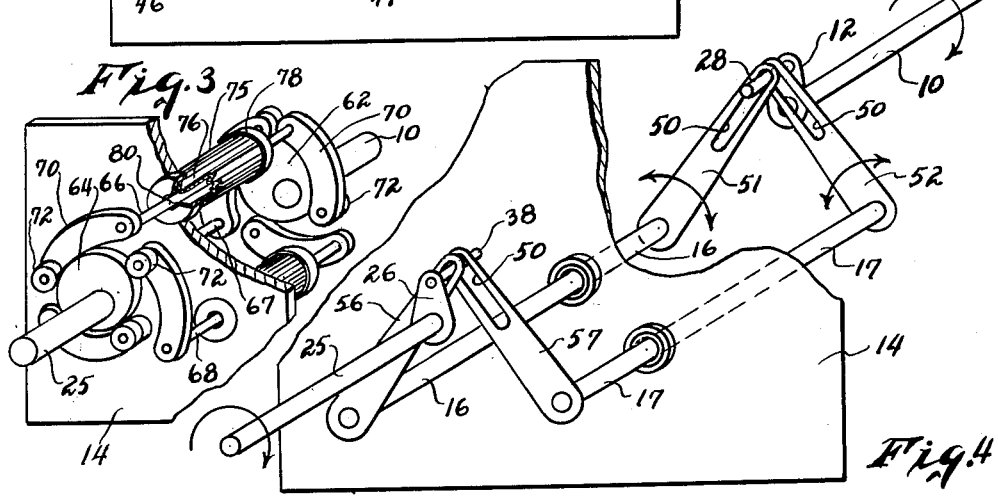
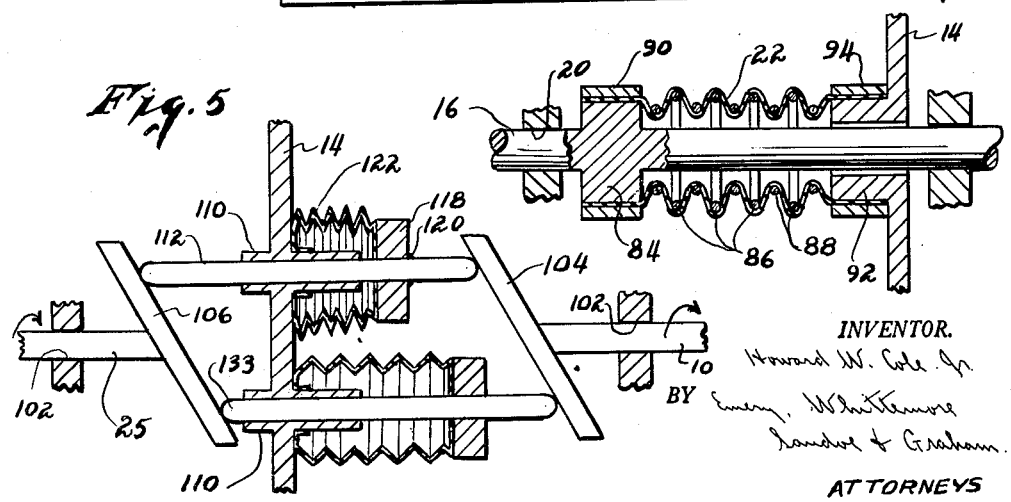
INVENTOR.
Howard W. Cole, Jr.
BY Emery, Whittemore
Sandoe & Graham
ATTORNEYS

United States Patent Office 3,028,761
Patented Apr. 10, 1962

3,028,761
HERMETICALLY SEALED ROTARY SHAFT COUPLING
Howard W. Cole, Jr., Mountain Lakes, N.J., assignor to Torque Industries, Inc., Boonton, N.J., a corporation of New Jersey
Filed Apr. 27, 1960, Ser. No. 25,052
14 Claims. (Cl. 74—69)

This invention relates to apparatus for transmitting motion and more especially to apparatus capable of transmitting continuous, unidirectional, rotary motion from one side of a partition or bulkhead to the other along shafting which is hermetically sealed where it passes through the bulkhead.

It is an object of the invention to provide improved motion-transmitting means for rotating an element behind a bulkhead and with the motion-transmitted mechanically through a hermetic seal. The motion of the movable structure that passes through the bulkhead may be a reciprocating motion, either axial an angular, but it cannot be unidirectional rotary motion since this requires running clearance and is inconsistent with a hermetic seal.

Another object of the invention is to provide reciprocating shafting with sleeve means surrounding the shafting and connected to it at one end, and with the sleeve means adapted to be connected to the bulkhead at the other end, combined with a shaft having continuous, unidirectional rotation and mechanism operably connecting the rotary shaft with the shafting in the sleeve means for transmitting and converting the motion of one to the other.

Other objects, features and advantages of the invention will appear or be pointed out as the description proceeds.

In the drawing, forming a part hereof, in which like reference characters indicate corresponding parts in all the views;

FIGURE 1 is a diagrammatic view showing one form of the invention for transmitting rotary motion from one side of a bulkhead to the other;

FIGURES 2 and 3 are similar to FIGURE 1 but showing other forms of the invention;

FIGURE 4 is a sectional view showing hermetic sealing means for connection with the shafting and bulkhead of FIGURE 1; and FIGURE 5 is a diagrammatic sectional view showing another form of the invention.

FIGURE 1 shows a drive shaft 10 having a crank 12 for driving shafting which extends through a partition or bulkhead 14. This shafting includes two parallel shafts 16 and 17 extending through bearings 20 supported by the bulkhead 14.

The openings in the bulkhead 14 through which the shafts 16 and 17 pass, are hermetically sealed by sleeves 22. Each of these sleeves has one end attached to its associated shaft 16 or 17 and has its other end secured to the bulkhead 14. This construction will be described in more detail in connection with FIGURE 4. For the present it is sufficient to understand that the hermetic seals, provided by the sleeves 22, permit a limited oscillating movement of the parallel shafts 16 and 17 about their longitudinal axes, but do not permit rotary motion beyond the angular limit of resilience of these sleeves 22.

On the side of the bulkhead 14, opposite the drive shaft 10, there is a driven shaft 25 having a crank 26 which is driven by motion-transmitting connections from the shafts 16 and 17.

The drive shaft 10 transmits motion to the parallel shafts 16 and 17 through a pin 28 connecting the driving crank 12 with connecting rods 31 and 32. These connecting rods 31 and 32 are connected, by pins 34, to cranks 36 and 37 secured to the parallel shafts 16 and 17, respectively.

The driving crank 12 is substantially shorter than the cranks 36 and 37 so that a complete rotation of the crank 12 about the longitudinal axis of the drive shaft 10 imparts only a limited reciprocating movement to the cranks 36 and 37 about the axes of their shafts 16 and 17, respectively.

In order to prevent either or the cranks 36 and 37 from moving close to a dead-center position, the cranks 36 and 37 are made substantially longer than the crank 12 and preferably about twice as long.

The motion-transmitting connections between the crank 26 and the parallel shafts 16 and 17 is the same as that between the driving crank 12 and the parallel shafts 16 and 17. It includes a crank pin 38 providing a pivotal connection for the crank 26 to connecting rods 41 and 42. These connecting rods 41 and 42 are joined by pins 44 to cranks 46 and 47 secured to the parallel shafts 16 and 17, respectively. The oscillating movement of the cranks 46 and 47 produces a unidirectional rotation of the driven shaft 25 similar to the rotation of the drive shaft 10.

The principle of the mechanism shown in FIGURE 1 for transmitting unidirectional rotary motion to oscillating shafting which transforms its motion back to unidirectional rotary motion on the other side of a bulkhead can be used with various other motion-transmitting connections. FIGURE 2 shows one modification in which a pin-and-slot connection is substituted for the connecting rods of FIGURE 1.

In FIGURE 2 the crank pin 28 of the driving crank 12 extends through slots 50 in cranks 51 and 52 connected to the ends of the parallel shafts 16 and 17, respectively.

On the other side of the bulkhead 14, the shafts 16 and 17 have cranks 56 and 57 which are the same as the cranks 51 and 52, and which impart rotary motion to the crank 26 of the driven shaft 25.

FIGURE 3 shows another mechanical expedient for transmitting rotary motion of the drive shaft 10 to the driven shaft 25 through the bulkhead 14. In FIGURE 3 there is an eccentric 62 secured to the drive shaft 10 in place of the driving crank. There is an identical eccentric 64 secured to the driven shaft 25. These eccentrics 62 and 64 are preferably of the same phase angle on their shafts 10 and 25.

In FIGURE 3, the shafting which extends through the bulkhead 14 includes three parallel shafts 66, 67 and 68. Each of these shafts 66—68 has a cam follower on each end consisting of a crank arm 70, secured to the shaft and a roller 72 in contact with the periphery of one of the eccentrics 62 or 64.

In the construction illustrated in FIGURE 3, the crank arms 70, at the opposite ends of each of the parallel shafts 66—68, extend in a different direction so that the roller 72 at one end of each shaft contacts with its associated eccentric 62 or 64 at a diametrically opposite point from that of the roller at the opposite end of that shaft.

The rollers 72 around each eccentric are preferably located at equal angular positions around the axis of rotation of that associated eccentric.

The means for hermetically sealing the openings in the bulkhead 14, through which the parallel shafts 66—68 extend, is somewhat different in FIGURE 3 than in the other figures. This sealing means includes a pleated tube 75 with one end of the tube hermetically sealed to the bulkhead 14 at the location 76, and with the other end of the tube 75 hermetically sealed to a flange 78 which is rigidly and hermetrically attached to the shaft 66 around the entire circumference of the shaft at a station 80.

The sealing of all of these parallel shafts 66—68 is identical; and the sleeves 75 are made of gas-tight, resilient material capable of twisting as much as necessary to permit the angular oscillations of the parallel shafts 66—68.

FIGURE 4 shows a sectional view of means for hermetically sealing the shaft 16 or any of the other parallel shafts which extend through the bulkhead 14. There is a collar 84 on the shaft 16. This collar is of one-piece construction with the shaft in FIGURE 4, but may be integrally connected to the shaft by brazing, welding, or any other bonding which will insure against leakage of gas along the surface of the shaft 16.

The sleeve 22 is made with circumferentially-extending corrugations 86, and there are preferably wire rings 88 in all of the corrugations, that is, both inside and outside. These wire rings 88 reinforce the sleeve 22 and spread the stress resulting from the twisting which occurs in the sleeve 22 when the shaft 16 is oscillating.

One end of the sleeve 22, which is secured to the collar 84, is shown surrounded by a clamping ring 90. The other end of the sleeve 22 is secured to a hub 92 of the bulkhead 14 and is surrounded by a clamping ring 94. Both ends of the sleeve 22 provide a hermetic seal at the part to which they are connected. These seals prevent the shaft 16 from rotating; but the sleeve 22 has sufficient resilience, as previously explained, to permit a limited angular oscillation of the shaft 16.

FIGURE 5 shows another modification of the invention in which the shafting, which extends through the bulkhead 14, reciprocates in the direction of its length, instead of having angular reciprocation about a center as in the forms of the invention illustrated in FIGURES 1–4. The drive shaft 10 rotates in a bearing 102 and has a wobble plate 104 secured to the end of the drive shaft 10 which confronts the bulkhead 14. The driven shaft 25 rotates in a similar bearing 102 and has a wobble plate 106 secured to the end of the driven shaft which is adjacent to the bulkhead 14.

Between the wobble plates 104 and 106 there is shafting consisting of a plurality of shafts extending through bearings 110 in the bulkhead 14. These shafts include at least two shafts 112 and 113 as shown in FIGURE 5, and preferably at least one other shaft, not in the plane of section, but located in angular relation to the shafts 110 and 112 around the common axis of rotation of the drive shaft 10 and the driven shaft 25. Greater numbers of shafts can be used.

These parallel shafts 112 and 113 have rounded ends in contact with the wobble plates 104 and 106 and the shafts 112 and 113 reciprocate back and forth in the bearings 110 as the wobble plates 104 and 106 rotate. Since the wobble plate 106 is at the same angle to its axis of rotation as is the wobble plate 104, reciprocating movement imparted to the shafts 112 and 113 by the driving wobble plate 104 is transformed into unidirectional rotary movement of the wobble plate 106 and its connected shaft 25.

Because of the fact that the shafts 112 and 113 reciprocate in an axial direction, instead of having angular reciprocation as in the other views, a different kind of sealing means is required for hermetically sealing the shafts where they pass through the bulkhead 14. The shaft 112 has a collar 118 rigidly secured to it by welding 120. A corrugated tube 122 is bonded to the collar 118 at one end, and is bonded to the bulkhead 14 at the other end. This tube 122 has circumferentially-extending corrugations or pleats with sufficient resilience to permit the tube 122 to expand and contract axially for a distance equal to the stroke of the reciprocating shaft 112. The other shafts which are parallel to the shaft 112 have similar pleated tubes for providing hermetic sealing where these shafts extend through the bulkhead 14.

The preferred embodiments of the invention have been illustrated and described, but changes and modifications can be made and some features can be used in different combinations without departing from the invention as defined in the claims.

What is claimed is:

1. Apparatus for transmitting continuous rotary motion through a bulkhead including shafting extending through the bulkhead, bearings supporting the shafting for rotational movement, sealing means having surface areas rigidly connected to the bulkhead and other surface areas rigidly connected to the shafting, the sealing means being made of yieldable material between the surface areas whereby the shafting and its connected areas of the sealing means can oscillate as a unit through a limited angle of rotational movement while the bulkhead and its connected areas of the sealing means remain stationary, a drive shaft on one side of the bulkhead and movable with continuous unidirectional rotary motion about its longitudinal axis, an intermittent motion mechanism operably connecting the drive shaft with one end of said shafting, the intermittent motion mechanism operating to convert unidirectional rotation of the drive shaft into oscillating angular rotational movement of the shafting, a driven shaft on the side of the bulkhead opposite the drive shaft, and a complementary intermittent motion mechanism connecting the shafting with the driven shaft and converting oscillating motion of the shafting into continuous unidirectional rotation of the driven shaft.

2. The motion-transmitting apparatus described in claim 1 and in which each of the intermittent motion mechanisms includes two cranks, each of which moves through a dead-center position, the cranks being in angular relation to one another and each of which is in position to transmit driving force during the period when the other is in a dead-center position.

3. The motion-transmitting apparatus described in claim 1 and in which the shafting includes two parallel shafts passing through the bulkhead, and the intermittent motion mechanisms include cranks at both ends of said parallel shafts.

4. The motion-transmitting apparatus described in claim 3 and in which there is a driving crank on the end of the drive shaft operably connected to the cranks at one end of each of the parallel shafts, and there is a driven crank on the end of the driven shaft operably connected to the cranks at the other ends of the parallel shafts.

5. The motion-transmitting apparatus described in claim 4 and in which each of the cranks of the parallel shafts is connected to its associated shaft of the driven and drive shafts by a connecting rod.

6. The motion-transmitting apparatus described in claim 4 and in which each of the cranks of the parallel shafts is connected with its associated crank of the drive and driven shafts by a pin-and-slot connection.

7. Motion transmitting apparatus for transmitting motion through a sealed bulkhead, said apparatus including a first rotary shaft that has continuous, unidirectional rotary movement about its longitudinal axis, a second shaft having similar unidirectional rotary movement and located in substantial alignment with the first shaft but with the ends of the shaft spaced apart and confronting one another, crank means on the confronting ends of both of the shafts, motion transmitting connections between the crank means of the different shafts, each of said connections having a follower at one end reciprocated by the crank means to the first shaft, and each of said connections having another follower at the other end reciprocated by motion of said connection from the first follower and in position to transmit motion to the crank means at the end of the second shaft in directions to rotate said second shaft with unidirectional rotary movement.

8. The motion transmitting apparatus described in claim 7, and in which the motion transmitting connections extend through a bulkhead and there is a resilient sleeve surrounding each of the motion transmitting connections and connecting at one end with the motion transmitting connection and at the other end with a bulkhead, through which the motion transmitting connection extends, to form a hermetic seal.

9. The motion transmitting apparatus described in claim 7, and in which there are at least two motion transmitting means extending between the crank means of the first and second shaft.

10. Motion transmitting apparatus for transmitting motion through a sealed bulkhead, said apparatus including shafting that has reciprocating movement, radial load-bearings in which the shafting is movable with respect to the bulkhead, a rotary shaft that has continuous, unidirectional, rotary movement about its longitudinal axis, and mechanism operably connecting the rotary shaft with said shafting and transmitting and converting the motion of one to the other, and in which the shaft includes two parallel shafts with a crank connected to the corresponding ends of said shaft, and means operably connecting the rotary shaft with the cranks, and in which the means operably connecting the rotary shaft with the cranks includes a crank on the end of the rotary shaft and connecting rods joining the crank on the end of the rotary shaft with the cranks on the ends of the parallel shafts.

11. Motion transmitting apparatus for transmitting motion through a sealed bulkhead, said apparatus including shafting that has reciprocating movement, radial load-bearings in which the shafting is movable with respect to the bulkhead, a rotary shaft that has continuous, unidirectional, rotary movement about its longitudinal axis, and mechanism operably connecting the rotary shaft with said shafting and transmitting and converting the motion of one to the other, and in which the shaft includes two parallel shafts with a crank connected to the corresponding ends of said shafts, and means operably connecting the rotary shaft with the cranks, and in which the means operably connecting the rotary shafts with the crank includes a crank on the rotary shaft and pin-and-slot connections joining the crank on the end of the rotary shaft with the cranks on the ends of the parallel shafts.

12. Motion transmitting apparatus for transmitting motion through a sealed bulkhead, said apparatus including shafting that has reciprocating movement, radial-load bearings in which the shafting is movable with respect to the bulkhead, a rotary shaft that has continuous, unidirectional, rotary movement about its longitudinal axis, and mechanism operably connecting the rotary shaft with said shafting and transmitting and converting the motion of one to the other, in which the shafting includes at least three parallel shafts, and there are bearings in which the parallel shafts have reciprocating axial movement, and said mechanism is a wobble plate secured to one end of the rotary shaft in position to reciprocate the parallel shafts.

13. Apparatus for transmitting continuous rotary motion from one side of a bulkhead to the other including a drive shaft on one side of the bulkhead, a driven shaft on the other side of the bulkhead, a cam on each shaft, a plurality of parallel shafts extending through the bulkhead, sealing means connected with the shafts and with the bulkhead and having resilience sufficient for limited oscillating movement of the parallel shafts about their axes, cranks on opposite ends of each of the parallel shafts, and cam followers on the cranks of all of the parallel shafts in contact with the cams at angularly-spaced regions around the periphery of each cam.

14. The apparatus for transmitting continuous rotary motion as described in claim 13 and in which the cams are eccentrics at the same phase angle of each of the shafts, and the cranks on the opposite ends of each of the parallel shafts are disposed in position to put their cam followers in contact with the different eccentrics at diametrically opposite locations on said different eccentrics.

References Cited in the file of this patent

UNITED STATES PATENTS

| | | |
|---|---|---|
| 2,119,955 | Litton | June 7, 1938 |
| 2,875,621 | Peters | Mar. 3, 1959 |